E. Wells,
Glass Furnace,
Nº 22,393.  Patented Dec. 21, 1858.
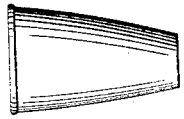
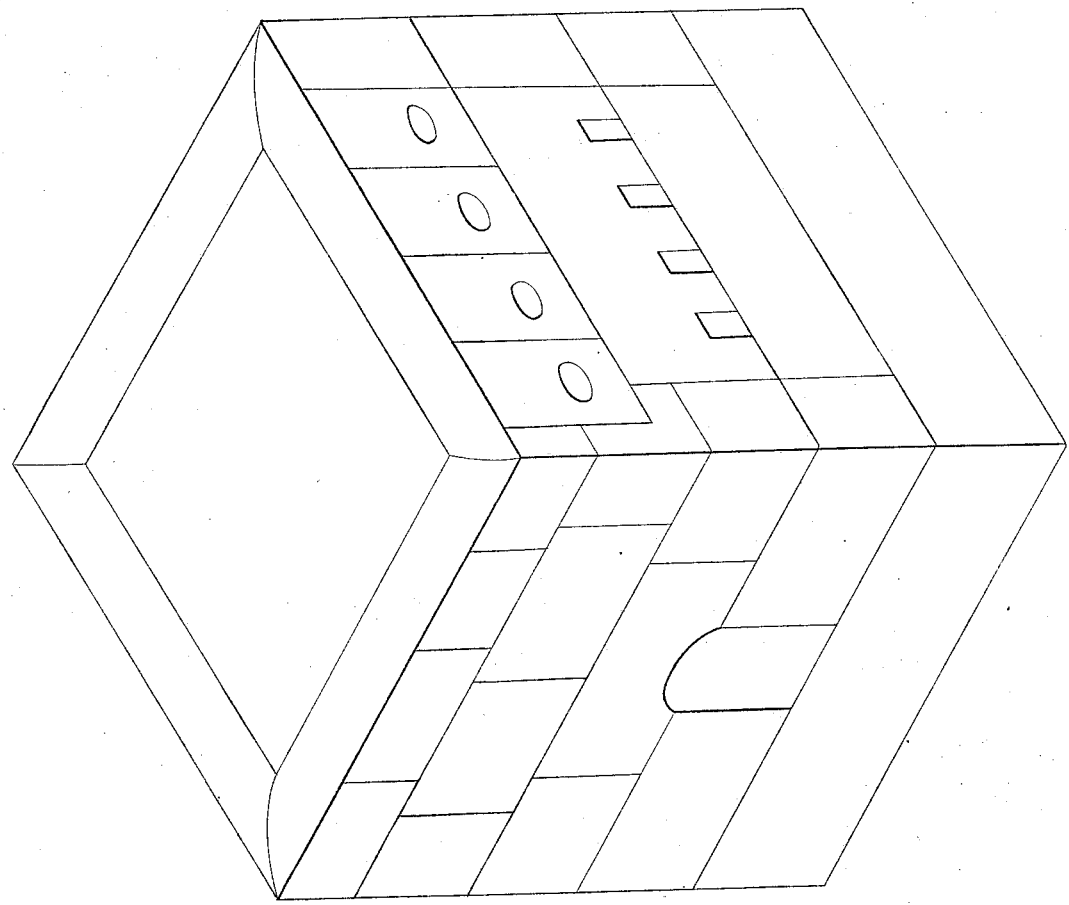
Witnesses  
Inventor.  
Ezra Wells

UNITED STATES PATENT OFFICE.

EZRA WELLS, OF COVINGTON, PENNSYLVANIA.

MANUFACTURE OF GLASS FURNACES AND POTS.

Specification of Letters Patent No. 22,393, dated December 21, 1858.

*To all whom it may concern:*

Be it known that I, EZRA WELLS, of Covington, in the county of Tioga and State of Pennsylvania, have invented a new and useful Improvement in Pots and Furnaces for Manufacturing Glass and Glassware; and I do hereby declare that the following is a full and exact description thereof, reference being had to the accompanying drawings and to the letters of reference marked thereon.

My invention consists of an improvement in the art of making pots and furnaces, to be employed in the manufacture of glass and glass ware, by the use of a certain black American clay. This clay occurs in different localities, as at or near Blossburgh, Pa. It is often found above the veins of bituminous coal, in regular layers or strata, of a dark or slate color, stony hardness, and an irregular and often conchoidal fracture. Specimens of this clay accompany this application. The specimens marked A, show the natural state of the clay which I have chiefly employed. The specimen marked B is the same clay in a pulverized state, and the specimens marked C are a furnace and pots molded from the clay in the following manner. The clay is prepared by grinding it very fine and then sifting it through a fine sieve,—say about twenty four to the inch. Thus prepared, the clay is mixed with water into a paste hard enough to handle. This paste is then thoroughly trodden twice a day for two weeks, when it is fitted for working into pots or into blocks for making furnaces. In manufacturing these pots, I prefer to place the paste upon a table and make it into rolls. These rolls are then put into molds, similar in shape to the pot desired, and pounded with the hand until they are quite solid. They are then placed in a warm room and left until they are perfectly dry, when the pots are fit for use. Or the pots may be completed without a mold.

In making a furnace, the clay is first worked into large blocks which are thoroughly dried and then cut into the required shape. The blocks are now ready to be laid up in the form desired for the furnace. Such furnace must be heated very slowly until the temperature is sufficient for the manufacture of glass or glassware.

In the accompanying drawings, Figure 2 represents a pot made as above described, and Fig. 1 a furnace made according to my invention. But I lay no claim to the form of these devices and only present them here to illustrate the use of my invention.

The above described mode of constructing pots and furnaces may be somewhat varied without departing from the principle of my invention. For instance, a mixture of the black American clay with other clays may be used. I have sometimes used one fifth part German clay with my black American clay, and thus have made excellent pots.

I have worked the black English Stenbridge clay, the German clay, and the French clay, but in all my experiments I have found them much inferior to the black American clay for pots and furnaces for the manufacture of glass. My pots made of this clay will endure twice the amount of heat in furnaces that pots made of other clays can. My pots will endure the most intense heat without becoming soft; they will stand three months in the furnace in constant use, while pots made of the German clay will not stand over six weeks. This difference I have found on every trial. In the furnace itself there seems to be no wear; the fire makes no visible impression.

Having thus fully described my invention, what I claim and desire to secure by Letters Patent of the United States is:

The new article of manufacture, namely pots and furnaces made of the black American clay for use in manufacturing glass and glass ware, substantially as set forth for the purposes described.

In witness whereof I hereunto set my hand this 18″ day of October, 1858.

EZRA WELLS.

Witnesses:
   IRA PATEKUE,
   EDWIN DYER, Jr.